United States Patent Office 2,967,109
Patented Jan. 3, 1961

2,967,109

PROCESS OF DEHYDRATING FRUIT AND VEGETABLE JUICES

Arthur I. Morgan, Jr., and John M. Randall, Berkeley, and Robert P. Graham, El Cerrito, Calif., assignors to the United States of America as represented by the Secretary of Agriculture No Drawing. Filed Oct. 30, 1958, Ser. No. 770,894

4 Claims. (Cl. 99—206)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of improved processes for dehydrating fruit and vegetable juices. A particular object of the invention is the provision of processes wherein the dehydration is conducted under atmospheric pressure to yield porous products which can be rapidly and easily reconstituted to form a juice having flavor, color, and nutrient value essentially the same as the original juice. Further objects and advantages of the invention will be apparent from the following description.

In the dehydration of fruit and vegetable juices a principal problem lies in the difficulty of obtaining products which will reconstitute readily. The mere subjection of juices to conventional dehydrating conditions such as exposing them to hot air or to the heated surface of a drum dryer will yield a dense, leathery product which has no practical value as it is virtually impossible to reconstitute. Recently, it has been shown that fruit and vegetable juices can be successfully dried by exposing a layer of concentrated juice to vacuum under temperature conditions at which the juice remains in a puffed or expanded condition. Although this process yields an excellent product, it requires expensive equipment because the drying mechanism must be in a vacuum-tight system and the maintenance of the vacuum by steam ejectors or the like during the dehydration involves a considerable expense.

In accordance with the present invention the dehydration is accomplished under normal (atmospheric) pressure instead of under vacuum. Despite this departure from currently accepted procedures, the dehydrated products of the invention are in a porous condition and are easily rehydratable. In addition, the dehydration is accomplished without material damage to the color, flavor, and nutritive content of the juice. Since the dehydration is carried out at normal pressures, relatively inexpensive equipment may be used and operating expenses are minimized.

The essential steps in the process of the invention are—

(a) A liquid concentrate of the juice is converted into a stable foam by incorporating therewith a minor proportion of a surface active agent and a substantial quantity of air or other non-toxic gas.

(b) The foam in the form of a relatively thin layer is exposed to a current of hot air until it is dehydrated.

The foam consists of a body of the juice concentrate throughout which is interspersed a multitude of gas bubbles. The presence of the bubbles gives the foam a volume substantially greater than that of the juice concentrate, per se. During the dehydration step, the mass of foam retains this expanded volume with the result that the final product is a brittle, sponge-like, porous mass consisting of a matrix of solid fruit or vegetable material in which is interspersed a multitude of voids. This porous mass can be easily crushed to form a product in the form of flakes. These flakes on addition to water and stirring by hand for a few seconds form a reconstituted juice free from lumps or other undispersed particles. The fact that the initial concentrate is applied to dehydration in the form of a foam and that the volume thereof is maintained during dehydration are the keys to the formation of the easily rehydrated porous product. Moreover, by such means the dehydration takes place rapidly and efficiently because moisture can diffuse readily out of the expanded mass.

In preparing the foam, a surface active agent is added to the liquid juice concentrate and air or other non-toxic gas such as nitrogen, carbon dioxide, nitrous oxide, helium, propane, n-butane, isobutane, dichlorodifluoromethane, trichloromonofluoromethane, trifluoromonochloromethane, etc. is incorporated therein. The chemical nature of the surface active agent is of no moment to the operability of the invention as long as the agent possesses the ability to stabilize foams. Various examples of suitable agents are listed hereinafter. The proportion of surface active agent will vary depending on the properties of the juice concentrate, the properties of the agent in question, etc. In general, the proportion of surface agent may vary about from 0.1 to 2.0%, by weight based on the weight of solids in the concentrate. It is naturally desirable to use the lowest proportion of surface active agent compatible with production of a stable foam. Thus in any particular case, pilot trials may be conducted with different proportions of surface active agent and noting the stability of the foams after incorporation of gas. The stability of the foams may be easily determined by allowing the test batches of foam to stand at room temperature. A suitably stable foam is one which will retain its volume without any separation of gas from liquid for at least ½ hour, preferably at least 1 hour, when allowed to stand at room temperature.

Incorporation of the gas into the concentrate containing added surface active agent may be accomplished by any of the conventional methods used for example in aerating ice cream, salad dressings, and the like. A simple and efficacious expedient is to subject the concentrate to a rotating wire whip which beats air into the material. Another plan is to pump the concentrate through a conduit, a portion of which is of restricted cross-section to form a venturi, the gas being introduced at the zone of high velocity and low pressure within the venturi and so thoroughly commingled with and dispersed into the concentrate. For best results, it is preferred that the gas bubbles in the foam be of uniform small size, i.e., about 100 microns or less in diameter. The proportion of gas incorporated into the concentrate is generally regulated so that the gasified concentrate (foam) has a volume at least 1.5 times that of the concentrate prior to introduction of the gas. It is usually preferred that the foam have a volume about 2 to 3 times the volume of the concentrate to ensure formation of a highly porous dehydrated product. The foam volume may be increased above these levels to obtain even more highly porous products. Usually, however, it is desirable to limit the volume increase to about 5 times the original concentrate volume to avoid getting products having too low bulk density. That is, if excessive amounts of gas are added to the concentrate the dehydrated products although otherwise completely suitable from the standpoint of rehydration, taste, and color, will require too large a container to package a unit weight of product.

The concentrate may be cooled during introduction and dispersion of the gas therein; this generally promotes formation of a stable foam. If cooling is employed, any temperature below room temperature may be used provided the mass is not cooled enough to freeze it. Accordingly, temperatures not lower than about 35° F. are recommended.

Having prepared a foam as above described, the foam is spread out in a relatively thin layer and subjected to dehydration at atmospheric pressure by contact with heated air. The thickness of the layer of foam may be varied. Generally, layers about 1/8 inch to 1/2 inch give satisfactory results. Various types of dehydration equipment may be employed. For example, one may use a conventional cabinet drier wherein trays bearing the layer of gasified concentrate are subjected to a current of heated air. The trays may be imperforate or of screen material if the openings are not over about 1/16 inch. The foam will not pass through perforations of such screens. Continuous dehydrators of various types may be used, for example, driers equipped with mechanical drive arrangements to move trays bearing the foam through the apparatus while they are subjected to currents of hot air moving in concurrent, countercurrent, or cross-wise direction. The drier may be compartmentalized so that the advancing trays bearing the foam may be subjected to air currents at different velocities, temperatures, and directions. Devices of the continuous belt type may also be employed. A typical device of this kind includes an endless belt of stainless steel which is traversed about two spaced-apart drums. The foam is applied to the outer surface of the belt adjacent to one of the drums by a roller device or other suitable applicator. The layer of foam is then transported by the belt through a zone wherein it is contacted with currents of hot air to effectuate the dehydration. The dehydrated material is preferably cooled before removal from the belt. This can be accomplished by passing a cooling medium through the drum at the exit end of the belt. The cooled, dehydrated product is then removed from the belt by suitable scraping devices. The dehydration equipment, whether of batch or continuous type, may be provided with infra-red or other radiant heaters to provide auxiliary heat to the layer of foam undergoing dehydration.

In the dehydration, the layer of foam is contacted with hot air. The air temperature may range from about 120 to 220° F., the higher air temperatures in this range providing more rapid elimination of moisture. As noted hereinabove, a critical feature of the process of the invention is that the volume of the foam is retained during dehydration, thereby the final product is in a porous, easily reconstituted form. To ensure such a result, the foam layer may be kept under observation during dehydration and the temperature of the air reduced if the foam shows a tendency to decrease in volume. Thus, although it is desirable to use a high air temperature to obtain a rapid elimination of moisture, the air temperature should not be so elevated as to cause any substantial reduction in the volume of the foam. It is impossible to set forth numerical temperature limits in this connection because the stability of the foam will depend on many factors including efficacy of the surface active agent, temperature of the foam, moisture content of the foam, proportion of dissolved solids and insoluble solids in the foam, state of subdivision of the insoluble solids in the foam, chemical nature of fruit or vegetable materials in the foam, size of gas bubbles in the foam, rate of heating of the foam, softening temperature of the product etc. However, in any particular instance the air temperature may be controlled in accordance with visual observation and this system of control affords a more reliable guide than could numerical limits.

It is evident that during the dehydration the temperature of the product will rise and eventually equal that of the hot air stream. To avoid possibility of flavor damage by the product assuming too high a temperature, it is preferred to lower the air temperature in the final stages of the dehydration. Thus for example the air temperature in the final stage of dehydration may be at a maximum of 120 to 160° F. whereby the product temperature will not rise above these limits.

After contacting the layer of foam with hot air as described above there is produced a solid dehydrated product having essentially the same volume as the foam and in a porous, spongy form. The product will generally have a moisture content of about 5%, or less. Generally, it is preferred to cool the dehyrated product before removing it from the tray, belt, or other equipment on which it was dehydrated. Where the product is on trays, the trays may be cooled by subjection to a current of cool, dry air. Where the dehydration is accomplished on a continuous belt device, the cooling may be effected by transporting the dehydrated product on the belt about an internally cooled drum. In any event, the dehydrated product is cooled to about 70–100° F. and in such condition is especially brittle and easy to remove from the surface on which it is located. The product breaks up on contact with spatulas or scrapers into a mass of flakes or particles. In such form the product is ready for use or packaging.

In preparing the foam for dehydration it is necessary to start with a juice in liquid concentrate form. Juices in their normal state are too thin and watery to form stable foams. The invention may be applied to liquid juice concentrates prepared from any fruit or vegetable, for example, orange, grapefruit, lemon, lime, apple, pear, apricot, strawberry, raspberry, pineapple, grape, prune, plum, peach, cherry, tomato, celery, carrot, spinach, lettuce, cabbage, watercress, etc. The juices may be prepared by subjecting the edible portions of the fruit or vegetable materials to such operations as reaming, pressing, macerating, crushing, comminuting, or extracting with water. The juice may be clear or contain suspended pulp. Methods of forming fruit and vegetable juices into liquid concentrates are well known in the art. A typical method involves evaporating the juice under vacuum at a temperature of 50 to 150° F. to avoid heat damage to the product. For use in the process of the invention, the concentrate should have a solids content of a least 20% by weight. There is no upper limit in the solids content as long as the concentrate is liquid. Depending on the concentration of solids and the proportion of suspended pulp, the concentrates may be syrupy, sauce-like or even of pasty consistency. Any such materials are considered as being liquids since they have fluid properties. It is generally preferred to employ concentrates which have as high a solids content as is compatible with retention of fluid character, whereby the proportion of moisture which must be removed in the dehydration step in accordance with the invention is minimized.

As noted hereinabove, a surface active agent is incorporated into the liquid juice concentrate so as to enable formation of a stable foam when the gas is added. The chemical nature of the surface active agent is of no concern to the operativeness of the process as long as the agent has the ability to stabilize foams. A multitude of such agents are known in the art and the invention encompasses the use of any of them. Typical examples of classes of surface active agents and individual agents which may be used are listed below:

Fatty acid monoesters of inner ethers of hexitols, the fatty acids containing at least six carbon atoms. Illustrative of this class are sorbitan monolaurate, sorbitan monomyristate, sorbitan monopalmitate, sorbtan monostearate, sorbitan monooleate, and sorbitan monolinoleate. The corresponding fatty acid esters of mannitan may also be used.

Condensation products of ethylene oxide with sorbitan or mannitan monofatty acid esters. Typical among these compounds are ethylene oxide condensates of sorbitan monolaurate, sorbitan monomyristate, sorbitan monopalmitate, sorbitan monostearate, sorbitan monooleate, and the like. These condensates may contain anywhere from 6 to 60 moles of ethylene oxide per mole of sorbitan monoester.

Condensation products of ethylene oxide with long-chain carboxylic acids, that is, compounds of the formula $$R-CO-(OC_2H_4)_n-OH$$

where R—CO is the acyl radical of a fat acid such as lauric, palmitic, oleic, stearic, etc. and n has a value from 6 to 60.

Condensation products of ethylene oxide with long-chain aliphatic alcohols, i.e., compounds of the formula $$R-(OC_2H_4)_n-OH$$

wherein R is the hydrocarbon radical of a long-chain alcohol such as dodecyl, tetradecyl, hexadecyl, octadecyl, oleyl, etc. and n has a value from 6 to 60.

Mono- or di-esters of sucrose and fatty acids containing at least six carbon atoms. Illustrative compounds of this class are sucrose monolaurate, sucrose monomyristate, sucrose monopalmitate, sucrose monostearate, sucrose monooleate, sucrose dilaurate, sucrose dimyristate, sucrose dipalmitate, sucrose distearate, sucrose dioleate, and the like.

Monoglycerides of higher fatty acids, for example, glycerol monolaurate, glycerol monomyristate, glycerol monopalmitate, glycerol monostearate, glycerol monooleate.

Salts of higher fatty acids, for example, sodium palmitate, sodium stearate, sodium oleate, or mixtures thereof.

Higher alkyl sulphates, as for example, sodium dodecyl sulphate, sodium tetradecyl sulphate, sodium hexadecyl sulphate, sodium octadecyl sulphate, sodium oleyl sulphate.

Higher alkyl sulphonates, e.g., sodium dodecane sulphonate, sodium tetradecane sulphonate, sodium hexadecane sulphonate, sodium octadecane sulphonate, sodium oleyl sulphonate.

Alkylaryl sulphonates such as the sodium alkyl ($C_8$–$C_{20}$) benzene sulphonates. Typical in this class are sodium dodecyl benzene sulphonate and sodium hexadecyl benzene sulphonate.

Alkyl ester of sulphosuccinic acid, for example, the sodium salt of dioctyl sulphosuccinate.

Sulphonated or sulphated fatty acid esters or amides, i.e., compounds of the types:

$$RCO-O-CH_2-CH_2-SO_3Na$$

$$RCO-NH-CH_2-CH_2-SO_3Na$$

$$RCO-O-CH_2-CH_2-OSO_3Na, \text{ and}$$

$RCO-NH-CH_2-CH_2-OSO_3Na$, wherein RCO— represents the acyl radical of a long-chain fatty acid such as lauric, myristic, palmitic, stearic, oleic, etc.

Condensates of ethylene oxide and alkyl phenols, that is, compounds of the type—

$$R-C_6H_4-(OC_2H_4)_n-OH$$

wherein R represents an alkyl radical containing 6 to 20 carbon atoms and n has a value of about 6 to 30.

Salts of bile acids, for example, bile salts as obtained from animal sources or alkali metal salts of individual bile acids such as cholic acid, dehydrocholic acid, desoxycholic acid, hyodesoxycholic acid, dehydrodesoxycholic acid, dehydrohyodesoxycholic acid, lithocholic acid, glycocholic acid, or taurocholic acid.

It will of course be appreciated that the particular surface active agent for use in the process of the invention will be selected according to the use which is to be made of the final product. Thus where the product is intended for edible purposes, the surface active agent selected will be one which is edible or at least which may be ingested without adverse effects. Thus for the production of edible products, we prefer to use surface active agents of the class of sucrose mono- or di-esters with higher fatty acids, agents of the class of glycerol monoesters of higher fatty acids, or agents of the class of polyoxyethylene derivatives of higher fatty acids, e.g., polyoxyethylene monostearate.

The invention is further demonstrated by the following illustrative examples wherein parts or percentages are by weight unless otherwise designated.

EXAMPLE I

Preparation of foam

The starting material was a tomato juice concentrate containing 30% solids and of a pasty consistency. Into 100 parts of this concentrate was incorporated 0.24 part of sucrose dipalmitate (0.8% based on solids content of concentrate). The surfactant-containing concentrate was then whipped with a power-operated egg beater, rotated at 500–700 r.p.m. for 5 minutes. A foam having a density of 0.4 gram per ml. was produced. A sample of this foam on standing at room temperature for 2 hours showed no change in height.

EXAMPLE II

Samples of the foam produced as described in Example I were spread on trays in layers ⅛" to ¼" thick. The trays carrying the foam layers were then placed in a cabinet type drier where they were subjected to hot air streams at 160°–180° F. until dehydration was complete (final moisture content about 5%). The velocity of the air streams in each case was about 100–200 ft. per minute.

In the following table are given the foam thickness, air temperature, and time for dehydration for each run.

| Run | Foam thickness, inches | Air temperature, °F. | Drying time, minutes |
|---|---|---|---|
| A | ¼ | 160 | 90 |
| B | ⅛ | 180 | 45 |
| C | 3/16 | 170 | 60 |
| D | ¼ | 180 | 60 |

After dehydration was complete, the products were cooled to room temperature in a dry atmosphere to prevent re-absorption of moisture. It was observed that all the products had a porous texture and the reduction in thickness of the layers during dehydration amounted to less than 10%. By applying a spatula to the trays the products parted from the trays readily and broke up into flakes. These flakes exhibited good rehydration properties. Thus by adding a suitable quantity of water and hand stirring with a spoon, reconstituted liquids free from lumps or grittiness were produced in 30 seconds or less. The proportions of dried product and water could be varied to obtain a reconstituted juice, a reconstituted concentrate or paste as desired. The reconstituted liquids showed no tendency of phase separation.

Having thus described our inventon, we claim:

1. A process for preparing a dehydrated product from a liquid concentrate selected from the group consisting of fruit juice concentrates and vegetable juice concentrates which comprises incorporating into the concentrate a non-toxic gas and a minor proportion of a surface active agent to form a stable foam, spreading the foam into a relatively thin layer, contacting the layer of foam at atmospheric pressure with hot air having a temperature, within the range from about 120 to 220° F., insufficiently high to cause the foam to decrease in volume and continuing said contact of the hot air with the foam until the foam is dehydrated to a solid, porous, readily rehydratable product.

2. A process for preparing a dehydrated product from liquid tomato juice concentrate which comprises incorporating into the said concentrate a minor proportion of a surface active agent, whipping air into the concentrate to form a stable foam, spreading the foam into a relatively thin layer, contacting the layer of foam at atmospheric pressure with hot air having a temperature, within the range from about 120 to about 220° F., insufficiently high to cause the foam to decrease in volume, and continuing said contact of the hot air with the foam until the foam is dehydrated to a solid, porous, readily rehydratable product.

3. The process of claim 2 wherein the hot air temperature is in the range from about 160 to 180° F.

4. A process for preparing a dehydrated product from liquid tomato juice concentrate which comprises incorporating into the said concentrate a minor proportion of a surface active agent, which is a member of the class consisting of sucrose mono- and di-esters of fatty acids containing at least eight carbon atoms, whipping air into the concentrate to form a stable foam, spreading the foam into a relatively thin layer, contacting the layer of foam at atmospheric pressure with hot air having a temperature, within the range from about 120 to about 220° F., insufficiently high to cause the foam to decrease in volume, and continuing said contact of the hot air with the foam until the foam is dehydrated to a solid, porous, readily rehydratable product.

References Cited in the file of this patent

UNITED STATES PATENTS

| | | |
|---|---|---|
| 2,490,951 | Dunkley | Dec. 13, 1949 |
| 2,557,155 | Strashun | June 19, 1951 |

FOREIGN PATENTS

| | | |
|---|---|---|
| 524,371 | Great Britain | Aug. 5, 1940 |